US011837265B2

(12) United States Patent
Sone (10) Patent No.: US 11,837,265 B2
(45) Date of Patent: Dec. 5, 2023

(54) OPTICAL RECORDING MEDIUM

(71) Applicant: SONY GROUP CORPORATION, Tokyo (JP)

(72) Inventor: Yasuhiro Sone, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/757,482

(22) PCT Filed: Dec. 23, 2020

(86) PCT No.: PCT/JP2020/048085
§ 371 (c)(1),
(2) Date: Jun. 16, 2022

(87) PCT Pub. No.: WO2021/132299
PCT Pub. Date: Jul. 1, 2021

(65) Prior Publication Data
US 2023/0018411 A1   Jan. 19, 2023

(30) Foreign Application Priority Data
Dec. 26, 2019   (JP) .................................. 2019-237191

(51) Int. Cl.
*G11B 5/62*   (2006.01)
*G11B 7/24*   (2013.01)
(Continued)

(52) U.S. Cl.
CPC ...... *G11B 7/24027* (2013.01); *G11B 7/00718* (2013.01); *G11B 7/243* (2013.01); *G11B 7/24056* (2013.01); *G11B 2007/24302* (2013.01)

(58) Field of Classification Search
CPC ................ G11B 7/007; G11B 7/00718; G11B 2007/0133; G11B 5/62; G11B 7/24; G11B 23/0064; G06F 2212/21
(Continued)

(56) References Cited

U.S. PATENT DOCUMENTS 10,522,181 B2 * 12/2019 Tabata ............... G11B 7/24073
2004/0152016 A1    8/2004 Mishima et al.
(Continued)

FOREIGN PATENT DOCUMENTS

CN       1560843 A     1/2005
CN      110313032 A   10/2019
(Continued)

OTHER PUBLICATIONS

International Search Report and Written Opinion of PCT Application No. PCT/JP2020/048085, dated Mar. 16, 2021, 08 pages of ISRWO.

*Primary Examiner* — Nabil Z Hindi
(74) *Attorney, Agent, or Firm* — CHIP LAW GROUP (57) ABSTRACT

An optical recording medium includes a plurality of information signal layers. The plurality of information signal layers include a recording layer having a first surface that faces a light irradiation surface and a second surface on the side opposite to the first surface, a first dielectric layer that is provided on the side of the first surface, and a second dielectric layer that is provided on the side of the second surface. The second dielectric layer provided in the information signal layer positioned on the innermost side when viewed from the light irradiation surface contains indium oxide and tin oxide. The recording layer provided in the information signal layer positioned on the innermost side when viewed from the light irradiation surface contains an oxide of a metal MA, an oxide of a metal MB, an oxide of a metal MD, and an oxide of a metal ME, the metal MA is
(Continued)

at least one selected from the group consisting of Mn and Ni, the metal MB is at least one selected from the group consisting of W, Mo, Zr and Ta, the metal MD is at least one selected from the group consisting of Cu and Ag, the metal ME is Nb, the contents of the metal MA, the metal MB and the metal ME satisfy the relationship of $0.30 \leq a_1/(b_1+e_1) \leq 0.41$ (where, $a_1$: atomic ratio [atomic %] of the metal MA with respect to a total amount of the metal MA, the metal MB, the metal MD and the metal ME, $b_1$: atomic ratio [atomic %] of the metal MB with respect to a total amount of the metal MA, the metal MB, the metal MD and the metal ME, and $e_1$: atomic ratio [atomic %] of the metal ME with respect to a total amount of the metal MA, the metal MB, the metal MD and the metal ME), and the atomic ratio $e_1$ of the metal ME with respect to a total amount of the metal MA, the metal MB, the metal MD and the metal ME is 5 atomic % or more and 18 atomic % or less.

11 Claims, 3 Drawing Sheets

(51) Int. Cl.
*G11B 7/24027* (2013.01)
*G11B 7/007* (2006.01)
*G11B 7/24056* (2013.01)
*G11B 7/243* (2013.01)

(58) Field of Classification Search
USPC .......................................... 369/275.4, 272.1
See application file for complete search history.

(56) References Cited

U.S. PATENT DOCUMENTS

| | | |
|---|---|---|
| 2005/0254407 A1 | 11/2005 | Hwang et al. |
| 2019/0371360 A1 | 12/2019 | Tsuchino et al. |

FOREIGN PATENT DOCUMENTS

| | | |
|---|---|---|
| EP | 1437724 A2 | 7/2004 |
| JP | 2005-129192 A | 5/2005 |
| JP | 2007-538351 A | 12/2007 |
| WO | 2005/112018 A1 | 11/2005 |
| WO | 2017/159560 A1 | 9/2017 |
| WO | 2017/159561 A1 | 9/2017 |
| WO | 2018/155070 A1 | 8/2018 |
| WO | 2019/172081 A1 | 9/2019 |

* cited by examiner

OPTICAL RECORDING MEDIUM

CROSS REFERENCE TO RELATED APPLICATIONS

This application is a U.S. National Phase of International Patent Application No. PCT/JP2020/048085 filed on Dec. 23, 2020, which claims priority benefit of Japanese Patent Application No. JP 2019-237191 filed in the Japan Patent Office on Dec. 26, 2019. Each of the above-referenced applications is hereby incorporated herein by reference in its entirety.

TECHNICAL FIELD

The present disclosure relates to an optical recording medium.

BACKGROUND ART

In recent years, in order to increase the recording capacity of an optical recording medium, a technique of increasing the number of information signal layers has been widely used. In a multi-layer optical recording medium, in order to improve medium characteristics, various materials of a recording layer included in the information signal layer have been studied.

For example, PTL 1 discloses that, when a recording layer having the following composition is provided as an information signal layer positioned on the innermost side (hereinafter may be referred to as an "innermost information signal layer") when viewed from a light irradiation surface, it is possible to achieve both reproduction durability (heat durability) and reflectance of the innermost information signal layer. The recording layer includes a recording layer containing an oxide of a metal MA, an oxide of a metal MB, an oxide of a metal MC, an oxide of a metal MD, and an oxide of a metal ME, and the metal MA is at least one selected from the group consisting of Mn and Ni, the metal MB is at least one selected from the group consisting of W, Mo, Zr and Ta, the metal MC is Zn, the metal MD is at least one selected from the group consisting of Cu and Ag, and the metal ME is Nb. In addition, the contents of the metal MA, the metal MB and the metal ME satisfy a relationship of $0.30 \leq a/(b+e) \leq 0.71$ (where, a: atomic ratio [atomic %] of the metal MA with respect to a total amount of the metal MA, the metal MB, the metal MC, the metal MD and the metal ME, b: atomic ratio [atomic %] of the metal MB with respect to a total amount of the metal MA, the metal MB, the metal MC, the metal MD and the metal ME, and e: atomic ratio [atomic %] of the metal ME with respect to a total amount of the metal MA, the metal MB, the metal MC, the metal MD and the metal ME). In addition, the atomic ratio e of the metal ME is 5 atomic % or more and 30 atomic % or less.

CITATION LIST

Patent Literature

[PTL 1]
WO 2019/172081

SUMMARY

Technical Problem

However, in the multi-layer optical recording medium described in PTL 1, film peeling may occur depending on the storage environment, and storage reliability may decrease.

An object of the present disclosure is to provide an optical recording medium that can minimize a decrease in storage reliability and can achieve both reproduction durability (heat durability) and reflectance of an innermost information signal layer.

Solution to Problem

In order to address the above problem, the present disclosure provides an optical recording medium including a plurality of information signal layers,
wherein the plurality of information signal layers include
a recording layer having a first surface that faces a light irradiation surface and
a second surface on the side opposite to the first surface,
a first dielectric layer that is provided on the side of the first surface, and
a second dielectric layer that is provided on the side of the second surface,
wherein the second dielectric layer provided in the information signal layer positioned on the innermost side when viewed from the light irradiation surface contains indium oxide and tin oxide,
wherein the recording layer provided in the information signal layer positioned on the innermost side when viewed from the light irradiation surface contains an oxide of a metal MA, an oxide of a metal MB, an oxide of a metal MD, and an oxide of a metal ME,
wherein the metal MA is at least one selected from the group consisting of Mn and Ni,
wherein the metal MB is at least one selected from the group consisting of W, Mo, Zr and Ta,
wherein the metal MD is at least one selected from the group consisting of Cu and Ag,
wherein the metal ME is Nb,
wherein the contents of the metal MA, the metal MB and the metal ME satisfy a relationship of $0.30 \leq a_1/(b_1+e_1) \leq 0.41$ (where, $a_1$: atomic ratio [atomic %] of the metal MA with respect to a total amount of the metal MA, the metal MB, the metal MD and the metal ME, $b_1$: atomic ratio [atomic %] of the metal MB with respect to a total amount of the metal MA, the metal MB, the metal MD and the metal ME, and $e_1$: atomic ratio [atomic %] of the metal ME with respect to a total amount of the metal MA, the metal MB, the metal MD and the metal ME), and wherein the atomic ratio $e_1$ of the metal ME with respect to a total amount of the metal MA, the metal MB, the metal MD and the metal ME is 5 atomic % or more and 18 atomic % or less.

In the present disclosure, it is preferable that a plurality of information signal layers be provided on a substrate and a cover layer be provided on the information signal layers. The thickness of the cover layer is not particularly limited, but since an objective lens having a high numerical aperture (NA) is used in a high-density optical recording medium, it is preferable to use a thin light transmitting layer such as a sheet and a coating layer as the cover layer, and record and reproduce an information signal by emitting light from the side of the light transmitting layer. In this case, it is also possible to use a substrate having opacity. The surface on which light for recording or reproducing an information signal is incident is appropriately set on at least one of the surface on the side of the cover layer and the surface on the side of the substrate according to the format of the optical recording medium.

In the present disclosure, the optical recording medium preferably has a configuration including a first disc and a second disc. The first disc and the second disc may include a substrate having a first surface and a second surface, a plurality of information signal layers provided on the side of the first surface of the substrate, and a cover layer provided on the plurality of information signal layers. A spacer layer may be provided between the information signal layers. The second surface of the substrate included in the first disc and the second surface of the substrate included in the second disc may be bonded to each other.

In the present disclosure, the optical recording medium preferably has a configuration including a substrate, a plurality of information signal layers provided on the substrate, and a cover layer provided on the plurality of information signal layers. A spacer layer may be provided between the information signal layers.

DESCRIPTION OF EMBODIMENTS

Embodiments of the present disclosure will be described in the following order.

1 First embodiment
  1.1 Overview
  1.2 Configuration of optical recording medium
  1.3 Method of producing optical recording medium
  1.4 Effects
2 Second embodiment
  2.1 Configuration of optical recording medium
  2.2 Method of producing optical recording medium
  2.3 Effects 1 First Embodiment

[1.1 Overview]

The inventors conducted extensive studies on the cause of the occurrence of film peeling in the multi-layer optical recording medium described in PTL 1. As a result, the inventors found the following. They found that film peeling is caused by the type of a material of a dielectric layer provided on the side of the substrate of the innermost information signal layer, and when a dielectric layer containing indium oxide and tin oxide is used as the dielectric layer, the occurrence of film peeling is minimized.

In addition, as described above, PTL 1 discloses that the contents of the metal MA, the metal MB and the metal ME satisfy a relationship of $0.30 \leq a/(b+e) \leq 0.71$, and the atomic ratio e of the metal ME is 5 atomic % or more and 30 atomic % or less. However, the inventors conducted extensive studies regarding characteristics of an optical recording medium in which a dielectric layer provided on the side of a substrate of an innermost information signal layer contains indium oxide and tin oxide, and found that, in a numerical range of $a/(b+e)$ and the atomic ratio e of the metal ME described in PTL 1, it is difficult to achieve both reproduction durability (heat durability) and reflectance of the innermost information signal layer, and it is not possible to secure a power margin of the innermost information signal layer.

Thus, the inventors conducted additional extensive studies in order to address the above problem in an optical recording medium in which a dielectric layer provided on the side of a substrate of an innermost information signal layer contains indium oxide and tin oxide. As a result, they found that, in an optical recording medium in which a dielectric layer provided on the side of a substrate of an innermost information signal layer contains indium oxide and tin oxide, when the contents of the metal MA, the metal MB and the metal ME satisfy $0.30 \leq a/(b+e) \leq 0.41$, and the atomic ratio e of the metal ME is 5 atomic % or more and 18 atomic % or less, it is possible to achieve both reproduction durability (heat durability) and reflectance of the innermost information signal layer, and it is possible to secure the power margin of the innermost information signal layer. Hereinafter, an optical recording medium having such a configuration will be described.

[1.2 Configuration of Optical Recording Medium]

Figure 1:
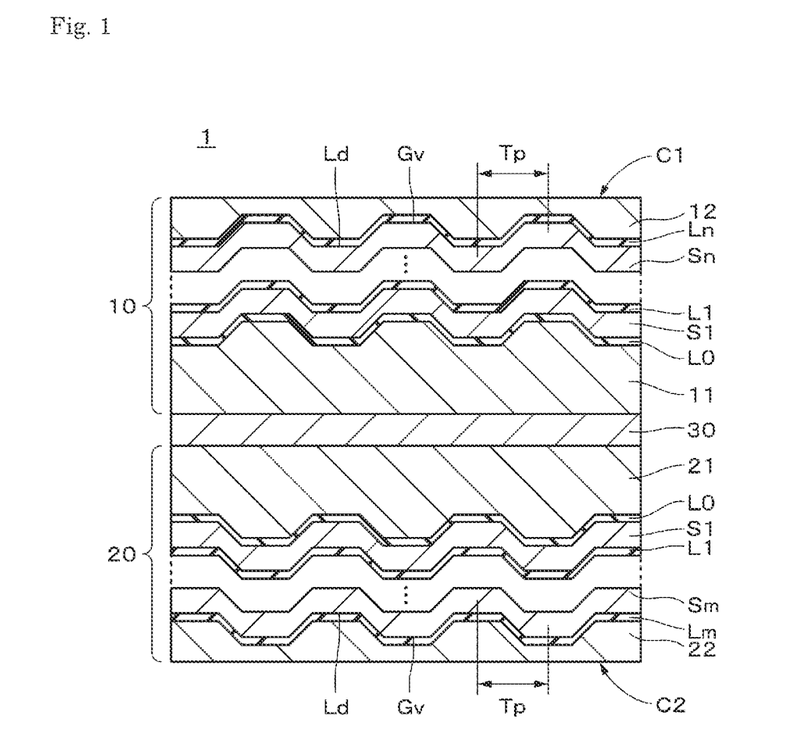
FIG. 1 is a cross-sectional view showing one configuration example of an optical recording medium according to a first embodiment of the present disclosure.

As shown in FIG. 1, an optical recording medium 1 according to a first embodiment of the present disclosure is a so-called multi-layer write-once type optical recording medium (for example, Archival Disc (AD)), and includes a first disc 10, a second disc 20, and a bonding layer 30 provided between the first and second discs 10 and 20. The optical recording medium 1 is an optical recording medium of a type in which data is recorded on both a groove track and a land track (hereinafter referred to as a "land/groove recording type"), and has a disk shape in which an opening (hereinafter referred to as a "center hole") is provided in the center. Here, the shape of the optical recording medium 1 is not limited to a disk shape, and may be any other shape.

The first disc 10 has a configuration in which an information signal layer L0, a spacer layer S1, an information signal layer L1, . . . , a spacer layer Sn, an information signal layer Ln, and a light transmitting layer 12, which is a cover layer, are laminated in that order on one main surface of a substrate 11. The second disc 20 has a configuration in which an information signal layer L0, a spacer layer S1, an information signal layer L1, . . . , a spacer layer Sm, an information signal layer Lm, and a light transmitting layer 22, which is a cover layer, are laminated in that order on one main surface of a substrate 21. Here, n and m each independently represent an integer of 2 or more, and are preferably an integer of 3 or more in order to improve the recording capacity. Here, in the following description, when the information signal layers L0 to Ln and L0 to Lm are not particularly distinguished, they will be referred to as the information signal layer L.

The optical recording medium 1 has a light irradiation surface on both sides to which a laser beam for recording or reproducing an information signal is irradiated, and more specifically, it has a first light irradiation surface C1 to which a laser beam for recording or reproducing an information signal in the first disc 10 is irradiated and a second light irradiation surface C2 to which a laser beam for recording or reproducing an information signal in the second disc 20 is irradiated.

In the first disc 10, the information signal layer L0 is positioned on the innermost side with respect to the first light irradiation surface C1, and the information signal layers L1 to Ln are positioned thereabove. Therefore, the information signal layers L1 to Ln have a configuration in which a laser beam used for recording or reproduction can be transmitted. On the other hand, in the second disc 20, the information signal layer L0 is positioned on the innermost side with respect to the second light irradiation surface C2, and the information signal layers L1 to Lm are positioned thereabove. Therefore, the information signal layers L1 to Lm have a configuration in which a laser beam used for recording or reproduction can be transmitted. Here, although not shown, the optical recording medium 1 may further include a hard coat layer on the surfaces (that is, the first and second light irradiation surfaces C1 and C2) of the light transmitting layers 12 and 22.

In the optical recording medium 1, an information signal in the first disc 10 is recorded or reproduced as follows. That is, when a laser beam is emitted from the first light irradiation surface C1 on the side of the light transmitting layer 12 to the information signal layers L0 to Ln included in the first disc 10, an information signal in the first disc 10 is recorded or reproduced. For example, when a laser beam in a wavelength range of 350 nm or more and 410 nm or less is condensed by an objective lens having a numerical aperture in a range of 0.84 or more and 0.86 or less, and is emitted from the side of the light transmitting layer 12 to the information signal layers L0 to Ln included in the first disc 10, an information signal is recorded or reproduced.

On the other hand, an information signal in the second disc 20 is recorded or reproduced as follows. That is, when a laser beam is emitted from the second light irradiation surface C2 on the side of the light transmitting layer 22 to the information signal layers L0 to Lm included in the second disc 20, an information signal in the second disc 20 is recorded or reproduced. For example, when a laser beam in a wavelength range of 350 nm or more and 410 nm or less is condensed by an objective lens having a numerical aperture in a range of 0.84 or more and 0.86 or less, and is emitted from the side of the light transmitting layer 22 to the information signal layers L0 to Lm included in the second disc 20, an information signal is recorded or reproduced.

Hereinafter, the substrates 11 and 21, the bonding layer 30, the information signal layers L0 to Ln and L0 to Lm, the spacer layers S1 to Sn and S1 to Sm, and the light transmitting layers 12 and 22 constituting the optical recording medium 1 will be sequentially described.

(Substrate)

The substrates 11 and 21 have, for example, a disk shape having a center hole in the center. One main surface of the substrates 11 and 21 is, for example, an uneven surface, and the information signal layer L0 is formed on the uneven surface. Hereinafter, in the uneven surface, a concave part will be referred to as a land Ld, and a convex part will be referred to as a groove Gv.

Examples of shapes of the land Ld and the groove Gv include various shapes such as a spiral shape and a concentric circle shape. In addition, the land Ld and/or the groove Gv may be wobbled (meandered) for stabilizing a linear velocity, adding address information, and the like.

Here, the spiral directions of the first disc 10 and the second disc 20 may be opposite to each other. In this case, since the optical recording medium (double-sided disc) 1 in which the first disc 10 and the second disc 20 are bonded to each other can be simultaneously recorded and reproduced, the data transfer speed during recording and reproduction can be increased by a factor of about 2.

The outer diameter (diameter) of the substrates 11 and 21 is selected to be, for example, 120 mm. The inner diameter (diameter) of the substrates 11 and 21 is selected to be, for example, 15 mm. The thickness of the substrate 11 is selected in consideration of rigidity, and is preferably 0.3 mm or more and 0.545 mm or less, and more preferably 0.445 mm or more and 0.545 mm or less.

As the material of the substrates 11 and 21, for example, a plastic material or glass can be used, and in consideration of moldability, it is preferable to use a plastic material. As the plastic material, for example, a polycarbonate resin, a polyolefin resin, an acrylic resin, or the like can be used, and in consideration of cost, it is preferable to use a polycarbonate resin.

(Bonding Layer)

The bonding layer 30 is composed of a cured UV curable resin. The first disc 10 and the second disc 20 are bonded to each other with the bonding layer 30 therebetween. More specifically, the substrate 11 of the first disc 10 and the substrate 21 of the second disc substrate are bonded to each other so that the light transmitting layers 12 and 22 are each on the surface side.

The thickness of the bonding layer 30 is, for example, 0.01 mm or more and 0.22 mm or less. The UV curable resin is, for example, a radical polymerization UV curable resin.

(Information Signal Layer)

The information signal layer L includes a concave track (hereinafter referred to as a "land track") and a convex track (hereinafter referred to as a "groove track"). The optical recording medium 1 according to the present embodiment has a configuration in which an information signal can be recorded in both the land track and the groove track. The track pitch Tp between the land track and the groove track is preferably 0.225 nm or less in order to obtain a high recording density.

Figure 2:
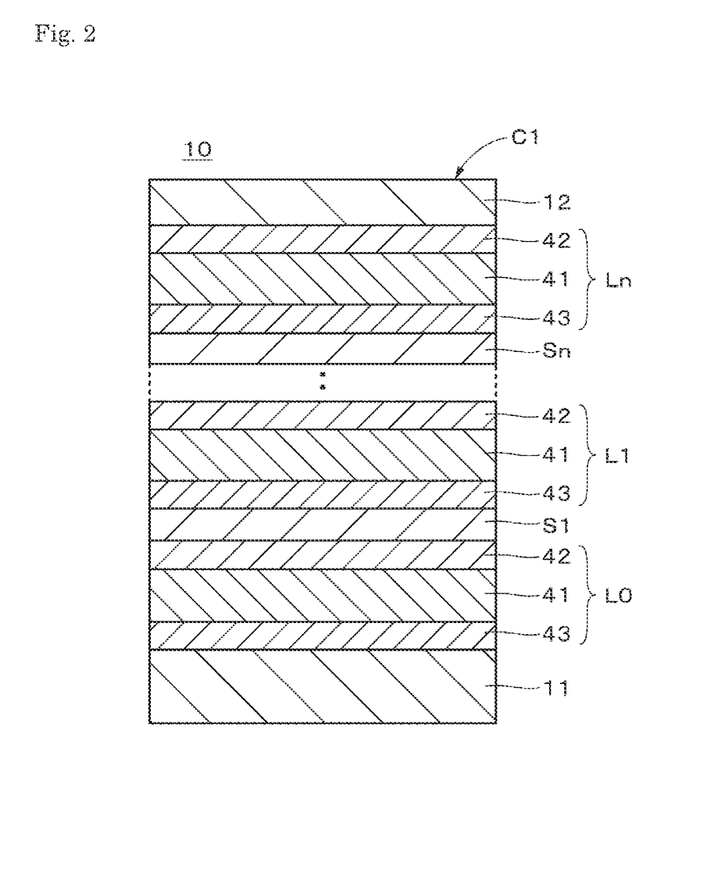
FIG. 2 is a schematic cross-sectional view showing one configuration example of information signal layers shown in FIG. 1.

As shown in FIG. 2, the information signal layers L0 to Ln include an inorganic recording layer (hereinafter simply referred to as a "recording layer") 41 having a first surface and a second surface, a dielectric layer (first dielectric layer) 42 provided adjacent to the recording layer 41 on the side of the first surface of the recording layer 41, and a dielectric layer (second dielectric layer) 43 provided adjacent to the recording layer 41 on the side of the second surface of the recording layer 41. With such a configuration, it is possible to improve the durability of the recording layer 41. Here, the first surface is a surface of two main surfaces of the recording layer 41, that faces the first light irradiation surface C1 (that is, a surface on the side to which a laser beam for recording or reproducing an information signal is emitted), and the second surface is a surface on the side opposite to the above first surface (that is, a surface on the side that faces the substrate 11). Here, since the information signal layers L0 to Lm can have the same configuration as the information signal layers L0 to Ln, descriptions thereof will be omitted.

When the number of layers in the information signal layer L of the first and second discs 10 and 20 is 3, the reflectance of the information signal layer L0 is preferably 3.0% or more and 4.5% or less, and more preferably 3.5% or more and 4.5% or less in order to secure a favorable recorded signal.

When the number of layers in the information signal layer L of the first and second discs 10 and 20 is 3, the lower limit value of the optimal recording power of the information signal layer L0 at a recording speed of 10× and a reproducing speed of 10× is preferably 58 mW or more, and more preferably 67 mW or more in order to secure repeated reproduction durability. The upper limit value of the optimal recording power of the information signal layer L0 at a recording speed of 10× and a reproducing speed of 10× is preferably 75 mW or less in consideration of the upper limit value of the recording Pw in existing consumer drives. Here, the speed of 1× is 3.5 m/s as a basis for the record/reproducing speed of 10×.

(Recording Layer)

The recording layer 41 provided in the information signal layer L0 contains an oxide of a metal MA, an oxide of a metal MB, an oxide of a metal MD, and an oxide of a metal ME as main components. The recording layer 41 included in the information signal layer L0 may further contain an oxide of a metal MC. The metal MA is at least one selected from the group consisting of Mn and Ni. The metal MB is at least one selected from the group consisting of W, Mo, Zr and Ta. The metal MC is Zn. The metal MD is at least one selected from the group consisting of Cu and Ag. The metal ME is Nb.

Here, "containing an oxide of a metal MA, an oxide of a metal MB, an oxide of a metal MD, and an oxide of a metal ME as main components" means that the total content of the above four oxides in the recording layer 41 is 50 atomic % or more. Here, in order to improve characteristics of the optical recording medium 1, the total content of the above four oxides in the recording layer 41 is preferably 60 atomic % or more, more preferably 75 atomic % or more, and still more preferably 90 atomic % or more.

The contents of the metal MA, the metal MB and the metal ME satisfy a relationship of $0.30 \leq a_1/(b_1+e_1) \leq 0.41$ (where, $a_1$: atomic ratio [atomic %] of the metal MA with respect to a total amount of the metal MA, the metal MB, the metal MD and the metal ME, $b_1$: atomic ratio [atomic %] of the metal MB with respect to a total amount of the metal MA, the metal MB, the metal MD and the metal ME, and $e_1$: atomic ratio [atomic %] of the metal ME with respect to a total amount of the metal MA, the metal MB, the metal MD and the metal ME). In addition, the atomic ratio $e_1$ of the metal ME with respect to the total amount of the metal MA, the metal MB, the metal MD and the metal ME is within a range of 5 atomic % or more and 18 atomic % or less.

As described above, when the contents of the metal MA, the metal MB and the metal ME satisfy a relationship of $0.30 \leq a_1/(b_1+e_1) \leq 0.41$, and the atomic ratio $e_1$ of the metal ME is within a range of 5 atomic % or more and 18 atomic % or less, the following effects can be obtained. That is, in the optical recording medium 1 in which the dielectric layer 43 of the information signal layer L0 contains a mixture of indium oxide and tin oxide ($In_2O_3$—$SnO_2$(ITO)), it is possible to achieve both reproduction durability (heat durability) and reflectance of the innermost information signal layer L0. In addition, it is possible to secure a power margin of the innermost information signal layer L0.

When the recording layer 41 included in the information signal layer L0 further contains an oxide of a metal MC, the contents of the metal MA, the metal MB and the metal ME satisfy a relationship of $0.30 \leq a_2/(b_2+e_2) \leq 0.41$ (where, $a_2$: atomic ratio [atomic %] of the metal MA with respect to a total amount of the metal MA, the metal MB, the metal MC, the metal MD and the metal ME, $b_2$: atomic ratio [atomic %] of the metal MB with respect to a total amount of the metal MA, the metal MB, the metal MC, the metal MD and the metal ME, and $e_2$: atomic ratio [atomic %] of the metal ME with respect to a total amount of the metal MA, the metal MB, the metal MC, the metal MD and the metal ME). In addition, the atomic ratio $e_2$ of the metal ME with respect to a total amount of the metal MA, the metal MB, the metal MC, the metal MD and the metal ME is within a range of 5 atomic % or more and 18 atomic % or less.

When the recording layer 41 included in the information signal layer L0 further contains an oxide of a metal MC, as described above, the contents of the metal MA, the metal MB and the metal ME satisfy a relationship of $0.30 \leq a_2/(b_2+e_2) \leq 0.41$, and the atomic ratio $e_2$ of the metal ME is within a range of 5 atomic % or more and 18 atomic % or less, and thus the following effects can be obtained. That is, in the optical recording medium 1 in which the dielectric layer 43 of the information signal layer L0 contains a mixture of indium oxide and tin oxide ($In_2O_3$—$SnO_2$(ITO)), it is possible to achieve both reproduction durability (heat durability) and reflectance of the innermost information signal layer L0. In addition, it is possible to secure a power margin of the innermost information signal layer L0.

The atomic ratio $a_1$ of the metal MA with respect to a total amount of the metal MA, the metal MB, the metal MD and the metal ME is, for example, 11 atomic % or more and 30 atomic % or less. The atomic ratio $b_1$ of the metal MB with respect to a total amount of the metal MA, the metal MB, the metal MD and the metal ME is, for example, 31 atomic % or more and 54 atomic % or less. The atomic ratio $d_1$ of the metal MD with respect to a total amount of the metal MA, the metal MB, the metal MD and the metal ME is, for example, 14 atomic % or more and 25 atomic % or less.

When the recording layer 41 provided in the information signal layer L0 further contains an oxide of a metal MC, the atomic ratio $a_2$ of the metal MA with respect to a total amount of the metal MA, the metal MB, the metal MC, the metal MD and the metal ME is, for example, 11 atomic % or more and 30 atomic % or less. The atomic ratio $b_2$ of the metal MB with respect to a total amount of the metal MA, the metal MB, the metal MC, the metal MD and the metal ME is, for example, 31 atomic % or more and 54 atomic % or less. The atomic ratio $c_2$ of the metal MC with respect to a total amount of the metal MA, the metal MB, the metal MC, the metal MD and the metal ME is, for example, more than 0 atomic % and 10 atomic % or less. The atomic ratio $d_2$ of the metal MD with respect to a total amount of the metal MA, the metal MB, the metal MC, the metal MD and the metal ME is, for example, 14 atomic % or more and 25 atomic % or less.

The recording layer 41 of the information signal layers L1 to Ln other than the information signal layer L0 contains, for example, an oxide of a metal MA, an oxide of a metal MB, an oxide of a metal MD, and an oxide of a metal ME as main components. The atomic ratios of the metals MA, MB, MD, and ME are appropriately selected according to characteristics required for each information signal layer L.

The recording layer 41 of the information signal layers L1 to Ln other than the information signal layer L0 may further contain an oxide of a metal MC. In this case, the atomic ratios of the metals MA, MB, MC, MD, and ME are appropriately selected according to characteristics required for each information signal layer L.

The thickness of the recording layer 41 is preferably in a range of 25 nm or more and 60 nm or less, and more preferably in a range of 30 nm or more and 50 nm or less. When the thickness of the recording layer 41 is 25 nm or more, excellent signal characteristics can be obtained. On the other hand, when the thickness of the recording layer 41 is 60 nm or less, a wide recording power margin can be secured.

(Dielectric Layer)

The dielectric layers 42 and 43 have a function as an oxygen barrier layer. Thereby, it is possible to improve the durability of the recording layer 41. In addition, the dielectric layers 42 and 43 have a function of minimizing escape of oxygen in the recording layer 41. Thereby, it is possible to minimize a change in the film quality of the recording layer 41 (mainly detected as a decrease in the reflectance), and it is possible to secure a preferable film quality as the recording layer 41. In addition, the dielectric layers 42 and 43 also have a function of improving recording characteristics. It is thought that, when this function is realized, heat diffusion of a laser beam that has entered the dielectric layers 42 and 43 is appropriately controlled, too much change in the shape of the recording part is minimized, crushing of the changed shape due to too much decomposition of a Mn oxide is minimized, and the change in shape during recording can be favorable.

The dielectric layer 43 provided in the information signal layer L0 contains a mixture of indium oxide and tin oxide ($In_2O_3$—$SnO_2$(ITO)). When the dielectric layer 43 provided in the information signal layer L0 contains a mixture of indium oxide and tin oxide, it is possible to minimize the occurrence of film peeling at an interface between the information signal layers L0 to Ln and the spacer layers S1 to Sn, an interface between the information signal layer Ln and the light transmitting layer 22 and the like.

The dielectric layer 42 provided in the information signal layers L0 to Ln and the dielectric layer 43 provided in the information signal layers L1 to Ln contain, for example, at least one selected from the group consisting of oxides, nitrides, sulfides, carbides and fluorides. Two or more dielectric layers 42 within the information signal layers L0 to Ln may contain the same dielectric material or may contain different dielectric materials. Two or more dielectric layers 43 within the information signal layers L0 to Ln may contain the same dielectric material or may contain different dielectric materials. The dielectric layers 42 and 43 provided on two sides of the information signal layers L0 to Ln may contain the same dielectric material or may contain different dielectric materials.

Examples of oxides include oxides of one or more elements selected from the group consisting of In, Zn, Sn, Al, Si, Ge, Ti, Ga, Ta, Nb, Hf, Zr, Cr, Bi and Mg. Examples of nitrides include nitrides of one or more elements selected from the group consisting of In, Sn, Ge, Cr, Si, Al, Nb, Mo, Ti, Nb, Mo, Ti, W, Ta and Zn, and preferably include nitrides of one or more elements selected from the group consisting of Si, Ge and Ti. Examples of sulfides include sulfides of Zn. Examples of carbides include carbides of one or more elements selected from the group consisting of In, Sn, Ge, Cr, Si, Al, Ti, Zr, Ta and W, and preferably include carbides of one or more elements selected from the group consisting of Si, Ti and W. Examples of fluorides include fluorides of one or more elements selected from the group consisting of Si, Al, Mg, Ca and La.

The dielectric layer 42 of the information signal layers L0 to Ln and the dielectric layer 43 of the information signal layers L1 to Ln may contain, for example, a mixture of the above materials. Specific examples of mixtures include a mixture of zinc sulfide and silicon oxide (ZnS—$SiO_2$), a mixture of silicon oxide, indium oxide, and zirconium oxide ($SiO_2$—$In_2O_3$—$ZrO_2$(SIZ)), a mixture of silicon oxide, chromium oxide and zirconium oxide ($SiO_2$—$Cr_2O_3$—$ZrO_2$ (SCZ)), a mixture of indium oxide and tin oxide ($In_2O_3$—$SnO_2$(ITO)), a mixture of indium oxide and cerium oxide ($In_2O_3$—$CeO_2$(ICO)), a mixture of indium oxide and gallium oxide ($In_2O_3$—$Ga_2O_3$(IGO)), a mixture of indium oxide, gallium oxide and zinc oxide ($In_2O_3$—$Ga_2O_3$—ZnO (IGZO)), a mixture of tin oxide and tantalum oxide ($Sn_2O_3$—$Ta_2O_5$(TTO)), a mixture of titanium oxide and silicon oxide ($TiO_2$—$SiO_2$), a mixture of aluminum oxide and zinc oxide ($Al_2O_3$—ZnO), a mixture of aluminum oxide and barium oxide ($Al_2O_3$—BaO), and a mixture of zinc oxide, tin oxide and zirconium oxide (ZnO—$SnO_2$—$ZrO_2$).

In order to improve reproduction durability, the dielectric layer 42 provided in the information signal layers L0 to Ln preferably contains a mixture of silicon oxide, indium oxide and zirconium oxide ($SiO_2$—$In_2O_3$—$ZrO_2$).

In order to improve reproduction durability, preferably, the dielectric layer 43 provided in the information signal layers L1 to Ln contains a mixture of zinc oxide, tin oxide and zirconium oxide (ZnO—$SnO_2$—$ZrO_2$), and more preferably, both the dielectric layer 42 and the dielectric layer 43 provided in the information signal layers L1 to Ln contain a mixture of zinc oxide, tin oxide and zirconium oxide.

The thickness of the dielectric layer 43 is preferably in a range of 2 nm or more and 30 nm or less. When the thickness of the dielectric layer 43 is 2 nm or more, it is possible to minimize a decrease in the barrier effect. On the other hand, when the thickness of the dielectric layer 43 is 30 nm or less, it is possible to minimize a decrease (deterioration) in the recording power margin.

The thickness of the dielectric layer 42 is preferably in a range of 2 nm or more and 50 nm or less. When the thickness of the dielectric layer 42 is 2 nm or more, it is possible to minimize a decrease in the barrier effect. On the other hand, when the thickness of the dielectric layer 42 is 50 nm or less, it is possible to minimize a decrease (deterioration) in the recording power margin.

(Spacer Layer)

The spacer layers S1 to Sn and S1 to Sm each have a function of separating the information signal layers L0 to Ln and L0 to Lm from each other with a physically and optically sufficient distance, and have an uneven surface. In the uneven surface, for example, the concentric or spiral land Ld and the groove Gv are formed. The thickness of the spacer layers S1 to Sn and S1 to Sm is preferably 9 μm or more and 50 μm or less. The material of the spacer layers S1 to Sn and S1 to Sm is not particularly limited, and a UV curable acrylic resin is preferably used. In addition, since the spacer layers S1 to Sn and S1 to Sm serve as optical paths for a laser beam for recording and reproducing data in the inner layer, they preferably have sufficiently high light transmission.

(Light Transmitting Layer)

The light transmitting layers 12 and 22 are, for example, resin layers obtained by curing a photosensitive resin such as a UV curable resin. Examples of materials of the resin layer include a UV curable acrylic resin. In addition, the light transmitting layers 12 and 22 may be composed of a light transmission sheet having a circular shape and an adhesive layer for bonding the light transmission sheet to the information signal layers Ln and Lm. The light transmission sheet is preferably formed of a material having a low absorption ability with respect to a laser beam used for recording and reproduction, and specifically preferably formed of a material having a transmittance of 90% or more. Regarding the material of the light transmission sheet, for example, a polycarbonate resin or a polyolefin resin (for example, ZEONEX (registered trademark)) can be used. Regarding the material of the adhesive layer, for example, a UV curable resin or a pressure sensitive adhesive (PSA) can be used.

The thickness of the light transmitting layers 12 and 22 is preferably selected from the range of 10 μm or more and 177 μm or less, and is selected to be, for example, 57 μm. When such thin light transmitting layers 12 and 22 are combined with, for example, an objective lens having a high NA of about 0.85, high-density recording can be realized.

(Hard Coat Layer)

The hard coat layer is used for imparting scratch resistance and the like to the first and second light irradiation surfaces C1 and C2. Regarding the material of the hard coat layer, for example, an acrylic resin, a silicone resin, a fluorine resin, or an organic-inorganic hybrid resin can be used. In order to improve the mechanical strength, the hard coat layer may contain fine silica gel powder.

In the optical recording medium 1 having the above configuration, when a laser beam is emitted to the recording layer 41, a Mn oxide is heated with a laser beam and decomposed to release oxygen, and the state of the part to which a laser beam is emitted changes. Thereby, it is possible to record an information signal irreversibly.

[1.3 Method of Producing Optical Recording Medium]

Next, an example of a method of producing the optical recording medium 1 according to the first embodiment of the present disclosure will be described.

(Process of Producing First Disc)

The first disc 10 is produced as follows.

(Molding Process of Substrate)

First, the substrate 11 having an uneven surface formed on one main surface is molded. Regarding the method of molding the substrate 11, for example, an injection molding (injection) method or a photopolymerization method (2P method: Photo Polymerization) can be used.

(Film Forming Process of Information Signal Layer)

Next, for example, the dielectric layer 43, the recording layer 41, and the dielectric layer 42 are sequentially laminated on the substrate 11 by a sputtering method, and thus the information signal layer L0 is formed. Hereinafter, the film forming process of the dielectric layer 43, the recording layer 41 and the dielectric layer 42 will be described in detail.

(Film Forming Process of Dielectric Layer)

First, the substrate 11 is transferred into a vacuum chamber containing a target for forming a dielectric layer, and the inside of the vacuum chamber is evacuated to reach a predetermined pressure. Then, while a process gas such as Ar gas or $O_2$ gas is introduced into the vacuum chamber, the target is sputtered to form the dielectric layer 43 on the substrate 11.

(Film Forming Process of Recording Layer)

Next, the substrate 11 is transferred into a vacuum chamber containing a target for forming a recording layer, and the inside of the vacuum chamber is evacuated to reach a predetermined pressure. Then, while a process gas such as Ar gas or $O_2$ gas is introduced into the vacuum chamber, the target is sputtered to form the recording layer 41 on the dielectric layer 43.

Here, regarding the target for forming a recording layer, a target having the same composition as that of the recording layer 41 provided in the information signal layer L0 may be used, or a target having a composition different from that of the recording layer 41 provided in the information signal layer L0 may be used. When the latter target is used as the target for forming a recording layer, the recording layer 41 may be formed by reactive sputtering with oxygen.

Regarding the target for forming a recording layer, a target containing a metal MA, a metal MB, a metal MD, and a metal ME is used. Here, the metal MA, the metal MB and the metal ME satisfy a relationship of $0.30 \leq a_1/(b_1+e_1) \leq 0.41$, and the atomic ratio $e_1$ of the metal ME with respect to a total amount of the metal MA, the metal MB, the metal MD and the metal ME is 5 atomic % or more and 18 atomic % or less. The target for forming a recording layer may be a metal oxide target or an alloy target.

When the recording layer 41 included in the information signal layer L0 further contains an oxide of a metal MC, a target containing a metal MA, a metal MB, a metal MC, a metal MD, and a metal ME is used as the target for forming a recording layer. Here, the metal MA, the metal MB and the metal ME satisfy a relationship of $0.30 \leq a_2/(b_2+e_2) \leq 0.41$, and the atomic ratio $e_2$ of the metal ME with respect to a total amount of the metal MA, the metal MB, the metal MC, the metal MD and the metal ME is 5 atomic % or more and 18 atomic % or less.

(Film Forming Process of Dielectric Layer)

Next, the substrate 11 is transferred into a vacuum chamber containing a target for forming a dielectric layer, and the inside of the vacuum chamber is evacuated to reach a predetermined pressure. Then, while a process gas such as Ar gas or $O_2$ gas is introduced into the vacuum chamber, the target is sputtered to form the dielectric layer 42 on the recording layer 41.

Accordingly, the information signal layer L0 is formed on the substrate 11.

(Process of Forming Spacer Layer)

Next, for example, the UV curable resin is uniformly applied onto the information signal layer L0 by a spin coating method. Then, an uneven pattern of a stamper is pressed against the UV curable resin uniformly applied onto the information signal layer L0, the UV curable resin is emitted with ultraviolet rays and cured, and the stamper is then peeled off. Thereby, the uneven pattern of the stamper is transferred to the UV curable resin, and for example, the spacer layer S1 in which the land Ld and the groove Gv are provided is formed on the information signal layer L0.

(Film Forming Process of Information Signal Layer and Process of Forming Spacer Layer)

Next, in the same manner as in the above "film forming process of information signal layer" and "process of forming spacer layer," an information signal layer L1, a spacer layer S2, an information signal layer L3, . . . , a spacer layer Sn, and an information signal layer Ln are laminated in that order on the spacer layer S1.

Here, regarding the target for forming a recording layer, a target having the same composition as that of the recording layer 41 provided in each of the information signal layers L1 to Ln may be used, or a target having a composition different from that of the recording layer 41 provided in each of the information signal layers L1 to Ln may be used. Regarding the target for forming a recording layer, for example, a target containing a metal MA, a metal MB, a metal MD, and a metal ME is used. The target may further contain a metal MC as necessary. The target for forming a recording layer may be a metal oxide target or an alloy target.

(Process of Forming Light Transmitting Layer)

Next, for example, a photosensitive resin such as a UV curable resin (UV resin) is spin-coated on the information signal layer Ln by a spin coating method, light such as ultraviolet rays is then emitted to the photosensitive resin, and curing is performed. Thereby, the light transmitting layer 12 is formed on the information signal layer Ln. Accordingly, the first disc 10 is produced.

(Process of Producing Second Disc)

Since "Process of producing second disc" is the same as the above "Process of producing first disc," descriptions thereof will be omitted.

(Bonding Process)

Next, as follows, a UV curable resin as an adhesive is stretched between the first and second discs 10 and 20 produced as described above by, for example, a spin coating method. First, a UV curable resin is applied in a ring shape along the peripheral edge of the center hole to the main surface of the two main surfaces of the second disc 20 that is on the side opposite to the second light irradiation surface C2. Next, the first disc 10 is pressed against the second disc 20 with the UV curable resin therebetween so that the main surface of the two main surfaces of the first disc 10 that is on the side opposite to the first light irradiation surface C1 and the main surface of the two main surfaces of the second disc 20 that is on the side opposite to the second light irradiation surface C2 face each other.

Next, the first and second discs 10 and 20 are rotated, and the UV curable resin is stretched between the first and second discs 10 and 20 in the radial direction of the first and second discs 10 and 20. Thereby, the UV curable resin spreads between the first and second discs 10 and 20 from the inner peripheral part to the outer peripheral part of the first and second discs 10 and 20. In this case, the thickness of the UV curable resin is adjusted to a predetermined thickness according to the rotational speed. Accordingly, the optical recording medium 1 having the bonding layer 30 in an uncured state is obtained.

Here, in the UV curable resin stretching process, it is preferable to emit ultraviolet rays to the outer peripheral part of the first and second discs 10 and 20 and temporarily cure the UV curable resin stretched to the outer peripheral part. Thereby, it is possible to prevent the occurrence of an opening in the outer peripheral part of the first and second discs 10 and 20.

Next, ultraviolet rays are emitted from both sides of the optical recording medium 1 with a UV lamp, and the bonding layer 30 is cured. Thereby, a desired optical recording medium 1 is obtained.

[1.4 Effects]

The optical recording medium 1 according to the first embodiment includes a plurality of information signal layers L0 to Ln. The dielectric layer 43 provided in the information signal layer L0 positioned on the innermost side when viewed from the first and second light irradiation surfaces C1 and C2 contains a mixture of indium oxide and tin oxide. The recording layer 41 provided in the information signal layer L0 positioned on the innermost side when viewed from the first and second light irradiation surfaces C1 and C2 among the plurality of information signal layers L0 to Ln contains an oxide of a metal MA, an oxide of a metal MB, an oxide of a metal MD, and an oxide of a metal ME. The metal MA is at least one selected from the group consisting of Mn and Ni, the metal MB is at least one selected from the group consisting of W, Mo, Zr and Ta, the metal MD is at least one selected from the group consisting of Cu and Ag, the metal ME is Nb. In addition, the contents of the metal MA, the metal MB and the metal ME satisfy a relationship of $0.30 \leq a_1/(b_1+e_1) \leq 0.41$, and the atomic ratio $e_1$ of the metal ME with respect to a total amount of the metal MA, the metal MB, the metal MD and the metal ME is 5 atomic % or more and 18 atomic % or less. Thereby, it is possible to minimize a decrease in storage reliability, and it is possible to achieve both reproduction durability (heat durability) and reflectance of the innermost information signal layer L0. In addition, it is possible to secure a power margin of the innermost information signal layer L0.

2 Second Embodiment

[2.1 Configuration of Optical Recording Medium]

Figure 3:
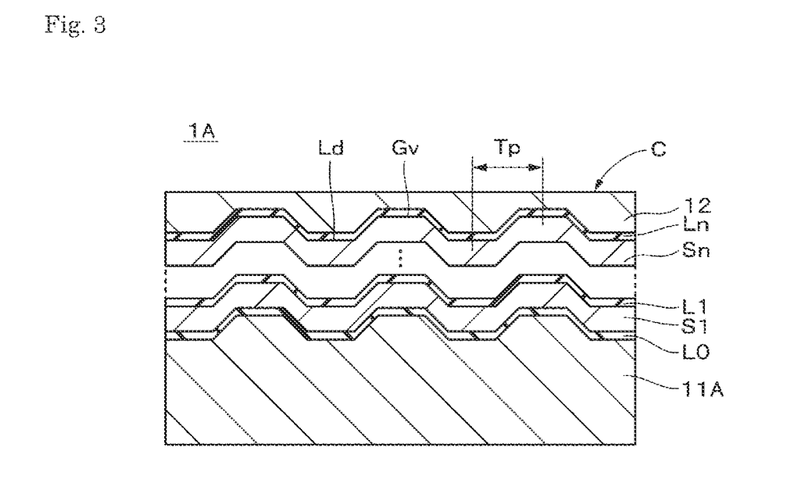
FIG. 3 is a cross-sectional view showing one configuration example of an optical recording medium according to a second embodiment of the present disclosure.

As shown in FIG. 3, an optical recording medium 1A according to a second embodiment of the present disclosure is a so-called multi-layer write-once type optical recording medium, and has a configuration in which an information signal layer L0, a spacer layer S1, an information signal layer L1, ..., a spacer layer Sn, an information signal layer Ln, and a light transmitting layer 12, which is a cover layer, are laminated in that order on one main surface of the substrate 11. Here, in the second embodiment, the same parts as those in the first embodiment will be denoted with the same reference numerals, and descriptions thereof will be omitted.

The optical recording medium 1A has a light irradiation surface C on one side to which light for recording or reproducing an information signal is emitted. The information signal layer L0 is positioned on the innermost side with respect to the light irradiation surface C, and the information signal layers L1 to Ln are positioned thereabove. Therefore, the information signal layers L1 to Ln have a configuration in which a laser beam used for recording or reproduction can be transmitted.

In the optical recording medium 1A according to the second embodiment, when a laser beam is emitted from the light irradiation surface C on the side of the light transmitting layer 12 to the information signal layers L0 to Ln, an information signal is recorded or reproduced. For example, when a laser beam in a wavelength range of 400 nm or more and 410 nm or less is condensed by an objective lens having a numerical aperture in a range of 0.84 or more and 0.86 or less, and emitted from the side of the light transmitting layer 12 to the information signal layers L0 to Ln, an information signal is recorded or reproduced. Examples of such an optical recording medium 1A include a multi-layer Blu-ray (registered trademark) disc (BD Disc).

The optical recording medium 1A is typically a groove recording type optical recording medium, but it may be a land/groove recording type optical recording medium or the like.

The diameter (diameter) of a substrate 11A is selected to be, for example, 120 mm. The thickness of the substrate 11 is selected in consideration of rigidity, and is preferably 0.3 mm or more and 1.3 mm or less, and more preferably 0.6 mm or more and 1.3 mm or less, and is selected to be, for example, 1.1 mm. In addition, the diameter of the center hole is selected to be, for example, 15 mm. The material of the substrate 11A is the same as that of the substrate 11 in the above first embodiment.

When the number of layers in the information signal layer L is 3, the reflectance of the information signal layer L0 is preferably 3.0% or more and 4.5% or less, and more preferably 3.5% or more and 4.5% or less in order to secure a favorable recorded signal.

The lower limit value of the optimal recording power of the information signal layer L0 at a recording speed of 4× and a reproducing speed of 4× is preferably 26 mW or more, and more preferably 30 mW or more in order to secure repeated reproduction durability. The upper limit value of the optimal recording power of the information signal layer L0 at a recording speed of 4× and a reproducing speed of 4× is preferably 38 mW or less in consideration of the upper limit value of the recording Pw in existing consumer drives. Here, the speed of 1× is 3.9 m/s as a basis for the record/reproducing speed of 4×.

[2.2 Method of Producing Optical Recording Medium]

The method of producing the optical recording medium 1A according to the second embodiment of the present disclosure is the same as the "Process of producing first disc" in the above first embodiment.

[2.3 Effects]

In the optical recording medium 1A according to the second embodiment, as in the optical recording medium 1 according to the first embodiment, it is possible to minimize a decrease in storage reliability and it is possible to achieve both reproduction durability (heat durability) and reflectance of the innermost information signal layer. In addition, it is possible to secure a power margin of the innermost information signal layer L0.

EXAMPLES

The present disclosure will be described below in detail with reference to examples, but the present disclosure is not limited to these examples.

In the following, the three information signal layers of the optical recording medium will be referred to as "L0 layer," "L1 layer," and "L2 layer" in order from the substrate toward the laser beam irradiation surface. In addition, "upward" means a direction from the substrate toward the laser beam irradiation surface, and "downward" means a direction from the laser beam irradiation surface toward the substrate.

Examples of the present disclosure will be described in the following order.
  i Examination of materials of first and second dielectric layers
  ii Examination of composition of recording layer provided in L0 layer <i. Examination of Materials of First and Second Dielectric Layers>

Examples 1-1 to 1-3, and Comparative Examples 1-1 and 1-2

First, a polycarbonate substrate having a thickness of 1.1 mm was molded by injection molding. Here, one main surface of the polycarbonate substrate was an uneven surface composed of lands and grooves. In addition, a track pitch Tp between the land and the groove was 0.225 nm. Next, a second dielectric layer, a recording layer, and a first dielectric layer were sequentially laminated on the uneven surface of the polycarbonate substrate by a sputtering method, and thus the L0 layer was formed.

A specific configuration of the L0 layer is shown below.
First Dielectric Layer (Upper Side)
Material: dielectric material shown in Table 1
Thickness: 10 nm
Recording Layer
Material: oxides containing metals MA(=Mn), MB(=W), MC(=Zn), MD(=Cu) and ME(=Nb) (where, a=20 atomic %, b=38 atomic %, c=10 atomic %, d=14 atomic %, e=18 atomic %, a/(b+e)=0.36)
Thickness: 33 nm
Second Dielectric Layer (Lower Side)
Material: dielectric material shown in Table 1
Thickness: 10 nm Next, a UV curable resin was uniformly applied onto the L0 layer by a spin coating method, an uneven pattern of a stamper was pressed against the UV curable resin applied onto the L0 layer, ultraviolet rays were emitted to the UV curable resin, curing was performed, and the stamper was then peeled off. Thereby, a spacer layer having an uneven surface composed of lands and grooves and having a thickness of 25 μm was formed. Here, the track pitch Tp between the land and the groove was set to 0.225 nm. Next, a second dielectric layer, a recording layer, and a first dielectric layer were sequentially laminated on the uneven surface of the spacer layer by a sputtering method, and thus the L1 layer was formed.

A specific configuration of the L1 layer is shown below.
First Dielectric Layer (Upper Side)
Material: dielectric material shown in Table 1
Thickness: 15 nm
Recording Layer
Material: (Mn—W—Zn—Cu—Ag)—O
Thickness: 33 nm
Second Dielectric Layer (Lower Side)
Material: dielectric material shown in Table 1
Thickness: 17 nm
Here, "(Mn—W—Zn—Cu—Ag)—O" indicates an oxide containing Mn, W, Zn, Cu and Ag.

Next, a UV curable resin was uniformly applied onto the L1 layer by a spin coating method, an uneven pattern of a stamper was pressed against the UV curable resin applied onto the L1 layer, ultraviolet rays were emitted to the UV curable resin, curing was performed, and the stamper was then peeled off. Thereby, a spacer layer having an uneven surface composed of lands and grooves and having a thickness of 18 μm was formed. Here, the track pitch Tp between the land and the groove was set to 0.225 nm. Next, a second dielectric layer, a recording layer, and a first dielectric layer were sequentially laminated on the uneven surface of the spacer layer by a sputtering method, and thus the L2 layer was formed.

A specific configuration of the L2 layer is shown below.
First Dielectric Layer (Upper Side)
Material: dielectric material shown in Table 1
Thickness: 17 nm
Recording Layer
Material: (Mn—W—Zn—Cu—Ag)—O
Thickness: 33 nm
Second Dielectric Layer (Lower Side)
Material: dielectric material shown in Table 1
Thickness: 17 nm Next, a UV curable resin was uniformly applied onto the L2 layer by a spin coating method, ultraviolet rays were emitted to the resin, curing was performed, and thus a light transmitting layer having a thickness of 57 μm was formed. Accordingly, a desired land/groove recording type three-layer optical recording medium was obtained.

(Evaluation of Storage Reliability)

First, the optical recording medium obtained as described above was subjected to an acceleration test (a temperature of 80° C., a humidity of 85% RH, and a storage time of 400 hours), and it was then checked whether film peeling had occurred in the optical recording medium by visual observation. The results are shown in Table 1. In addition, for the optical recording medium in which film peeling was confirmed, an interface at which film peeling occurred was checked by composition analysis. As a result, it was confirmed that film peeling occurred at the interface between the L0 layer and the spacer layer, the interface between the L1 layer and the spacer layer, and the interface between the L2 layer and the cover layer.

Table 1 shows the configurations and the evaluation results of the optical recording mediums of Examples 1-1 to 1-3 and Comparative Examples 1-1 and 1-2.

TABLE 1

| | L0 layer | | L1 layer | |
|---|---|---|---|---|
| | Second dielectric layer (lower side) | First dielectric layer (upper side) | Second dielectric layer (lower side) | First dielectric layer (upper side) |
| Example 1-1 | ITO | ZnO—SnO$_2$—ZrO$_2$ | ZnO—SnO$_2$—ZrO$_2$ | ZnO—SnO$_2$—ZrO$_2$ |
| Example 1-2 | ITO | SIZ | ZnO—SnO$_2$—ZrO$_2$ | SIZ |
| Example 1-3 | ITO | SIZ | SIZ | SIZ |
| Comparative example 1-1 | ZnO—SnO$_2$—ZrO$_2$ | ZnO—SnO$_2$—ZrO$_2$ | ZnO—SnO$_2$—ZrO$_2$ | ZnO—SnO$_2$—ZrO$_2$ |
| Comparative example 1-2 | SIZ | ZnO—SnO$_2$—ZrO$_2$ | ZnO—SnO$_2$—ZrO$_2$ | ZnO—SnO$_2$—ZrO$_2$ |

| | L2 layer | | Storage reliability |
|---|---|---|---|
| | Second dielectric layer (lower side) | First dielectric layer (upper side) | Occurrence of film peeling |
| Example 1-1 | ZnO—SnO$_2$—ZrO$_2$ | ZnO—SnO$_2$—ZrO$_2$ | No film peeling |
| Example 1-2 | ZnO—SnO$_2$—ZrO$_2$ | SIZ | No film peeling |
| Example 1-3 | SIZ | SIZ | No film peeling |
| Comparative example 1-1 | ZnO—SnO$_2$—ZrO$_2$ | ZnO—SnO$_2$—ZrO$_2$ | Film peeling |
| Comparative example 1-2 | ZnO—SnO$_2$—ZrO$_2$ | ZnO—SnO$_2$—ZrO$_2$ | Film peeling |

The composition ratios of dielectric materials (SIZ, ZnO—SnO$_2$—ZrO$_2$, ITO) shown in Table 1 are as follows.

SIZ: SiO$_2$(15)In$_2$O$_3$(50)ZrO$_2$(35) (where, the unit of the numerical value in parentheses is mol %)

ZnO—SnO$_2$—ZrO$_2$: ZnO(40)SnO$_2$(40)ZrO$_2$(20) (where, the unit of the numerical value in parentheses is mol %)

ITO: In$_2$O$_3$(90)SnO$_2$(10) (where, the unit of the numerical value in parentheses is wt %)

The following can be seen from Table 1.

In the optical recording mediums in which the second dielectric layer in the L0 layer was composed of ITO (Examples 13 to 15), film peeling of the optical recording medium did not occur. On the other hand, in the optical recording mediums in which the second dielectric layer in the L0 layer was composed of ZnO—SnO$_2$—ZrO$_2$ or SIZ (Comparative Examples 7 and 8), film peeling of the optical recording medium occurred.

<ii Examination of Composition of Recording Layer Provided in L0 Layer>

Examples 2-1 to 2-4, and 2-10, and Comparative Examples 2-2, 2-3, 2-5, and 2-6

First, a polycarbonate substrate having a thickness of 1.1 mm was molded by injection molding. Here, one main surface of the polycarbonate substrate was an uneven surface composed of lands and grooves. In addition, a track pitch Tp between the land and the groove was 0.225 nm. Next, a second dielectric layer, a recording layer, and a first dielectric layer were sequentially laminated on the uneven surface of the polycarbonate substrate by a sputtering method, and thus the L0 layer was formed.

A specific configuration of the L0 layer is shown below.
First Dielectric Layer (Upper Side)
Material: SIZ
Thickness: 10 nm
Recording Layer
Material: oxides containing metals MA, MB, MC, MD and ME shown in Table 2 (an oxide of a metal MA, an oxide of a metal MB, an oxide of a metal MC, an oxide of a metal MD and an oxide of a metal ME)
Thickness: 33 nm
Second Dielectric Layer (Lower Side)
Material: ITO
Thickness: 10 nm Next, a UV curable resin was uniformly applied onto the L0 layer by a spin coating method, an uneven pattern of a stamper was pressed against the UV curable resin applied onto the L0 layer, ultraviolet rays were emitted to the UV curable resin, curing was performed, and the stamper was then peeled off. Thereby, a spacer layer having an uneven surface composed of lands and grooves and having a thickness of 25 μm was formed. Here, the track pitch Tp between the land and the groove was set to 0.225 nm. Next, a second dielectric layer, a recording layer, and a first dielectric layer were sequentially laminated on the uneven surface of the spacer layer by a sputtering method, and thus the L1 layer was formed.

A specific configuration of the L1 layer is shown below.
First Dielectric Layer (Upper Side)
Material: SIZ
Thickness: 15 nm
Recording Layer
Material: (Mn—W—Zn—Cu—Ag)—O
Thickness: 33 nm
Second Dielectric Layer (Lower Side)
Material: SIZ
Thickness: 17 nm Next, a UV curable resin was uniformly applied onto the L1 layer by a spin coating method, an uneven pattern of a stamper was pressed against the UV curable resin applied onto the L1 layer, ultraviolet rays were emitted to the UV curable resin, curing was performed, and the stamper was then peeled off. Thereby, a spacer layer having an uneven surface composed of lands and grooves and having a thickness of 18 μm was formed. Here, the track pitch Tp between the land and the groove was set to 0.225 nm. Next, a second dielectric layer, a recording layer, and a first dielectric layer were sequentially laminated on the uneven surface of the spacer layer by a sputtering method, and thus the L2 layer was formed.

A specific configuration of the L2 layer is shown below.

First Dielectric Layer (Upper Side)
Material: SIZ
Thickness: 17 nm
Recording Layer
Material: (Mn—W—Zn—Cu—Ag)—O
Thickness: 33 nm
Second Dielectric Layer (Lower Side)
Material: SIZ
Thickness: 17 nm Next, a UV curable resin was uniformly applied onto the L2 layer by a spin coating method, ultraviolet rays were emitted to the resin, curing was performed, and thus a light transmitting layer having a thickness of 57 µm was formed. Accordingly, a desired land/groove recording type three-layer optical recording medium was obtained.

Examples 2-5 to 2-9 and Comparative Example 2-4

Optical recording mediums were obtained in the same manner as in Example 1-1 except that a recording layer in the L0 layer was formed of oxides containing metals MA, MB, MD and ME shown in Table 2 (an oxide of a metal MA, an oxide of a metal MB, an oxide of a metal MD and an oxide of a metal ME).

Comparative Example 2-1

An optical recording medium was obtained in the same manner as in Example 1-1 except that a recording layer in the L0 layer was formed of oxides containing metals MA, MB, MC and MD shown in Table 2 (an oxide of a metal MA, an oxide of a metal MB, an oxide of a metal MC and an oxide of a metal MD).

(Evaluation of Reflectance)

First, the reflectance R of the L0 layer of the optical recording medium obtained as described above was measured in the unrecorded part of the groove using a BD standard evaluation machine. Next, the measured reflectance R was evaluated according to the following criteria. The results are shown in Table 2.

Reflectance R was very good: 3.5%≤R≤4.5%
Reflectance R was good: 3.0%≤R<3.5%
Reflectance R was poor: 3.0%<R Here, in Table 2, the symbols "⊙," "o," and "x" indicate "very good reflectance," "good reflectance," and "poor reflectance," as the evaluation results, respectively. As described above, when the reflectance was in a range of 3.5%≤R≤4.5% and the reflectance was very good, a favorable recorded signal was obtained at a linear density higher than the AD1 standard, which is a higher linear density than the BDXL standard. When the reflectance was in a range of 3.0%≤R<3.5% and the reflectance was good, a favorable recorded signal was obtained at a linear density higher than the BDXL standard. When the reflectance was in a range of 3.0%<R and the reflectance was poor, it was difficult to obtain a favorable recorded signal at a linear density higher than the BDXL standard.

(Evaluation of Reproduction Durability)

First, a signal was recorded in grooves of 10 tracks using a BD standard evaluation machine for the L0 layer of the optical recording medium obtained as described above. Next, the signal recorded in the groove was reproduced, i-MLSE (reproduction characteristics) was obtained, and a recording power (optimal recording power) $P_{WO}$ at which the i-MLSE was the minimum value was defined as a recording sensitivity $P_{WO}$. Here, recording and reproduction were performed according to the BDXL standard. Specifically, the recording speed was set to 4×, the reproducing speed was set to 4×, and the recording density was set to 32 GB. Next, based on the obtained recording sensitivity $P_{WO}$, the reproduction durability was evaluated according to the following criteria. The results are shown in Table 2.

Reproduction durability was very good: 30 mW≤$P_{WO}$
Reproduction durability was good: 26 mW≤$P_{WO}$<30 mW
Reproduction durability was poor: $P_{WO}$<26 mW Here, in the evaluation column of the reproduction durability in Table 2, the symbols "⊙," "o," and "x" indicate "very good reproduction durability," "good reproduction durability," "poor reproduction durability," as the evaluation results, respectively.

In the evaluation of the reproduction durability, the reproduction durability can be evaluated according to the recording sensitivity because there is a correlation between the recording sensitivity (recording power) and the reproduction durability (heat durability), and there is a relationship that the reproduction durability is improved by lowering the sensitivity of the recording layer.

In the evaluation of the reproduction durability, "very good reproduction durability" specifically means that almost no deterioration was observed in the bottom characteristics even after reproduction 1 million times. "Good reproduction durability" specifically means that reproduction was possible even after reproduction 1 million times. "Poor reproduction durability" specifically means that reproduction became difficult after reproduction 1 million times.

(Evaluation of Power Margin)

First, a signal was recorded in grooves of 10 tracks using a BD standard evaluation machine for the L0 layer of the optical recording medium obtained as described above. Next, the signal recorded in the groove was reproduced, i-MLSE (reproduction characteristics) was obtained, the low recording power side with an i-MLSE exceeding 13% was set as Pwl, and the high recording power side was set as Pwh. Here, recording and reproduction were performed according to the BDXL standard. Specifically, the recording speed was set to 4×, the reproducing speed was set to 4×, and the recording density was set to 32 GB. Next, the obtained recording powers Pwl and Pwh and the optimal recording power Pwo were substituted into the following formula to obtain a power margin PM for SER.

$$PM[\%] = ((Pwh - Pwl)/Pwo) \times 100$$

Next, the power margin PM of the L0 layer of the optical recording medium was evaluated according to the following criteria.

Power margin PM was very good: 25%≤PM
Power margin PM was good: 20%≤PM<25%
Power margin PM was poor: PM<20%

Here, in the power margin evaluation column in Table 2, the symbols "⊙," "o," and "x" indicate "very good power margin," "good power margin," and "poor power margin," as the evaluation results, respectively.

Here, when the power margin PM was 20% or more, even if the laser power during recording fluctuated depending on the drive model, it was possible to maintain stable recording characteristics.

(Overall Evaluation)

Using the above evaluation results of the reflectance, reproduction durability and power margin, the optical recording mediums were comprehensively evaluated according to the following criteria.

Overall characteristics were very good: all of the reflectance, the reproduction durability and the power margin were very good Overall characteristics were good: none of reflectance, reproduction durability, and power margin was poor, and at least one of these characteristics was good Overall characteristics were poor: at least one of the reflectance, the reproduction durability and the power margin was poor Here, in the comprehensive evaluation column in Table 2, the symbols "⊚," "o," and "x" indicate "very good overall characteristics," "good overall characteristics," and "poor overall characteristics," as the evaluation results, respectively.

Table 2 shows the configurations and the evaluation results of the optical recording mediums of Examples 2-1 to 2-11 and Comparative Examples 2-1 to 2-6.

in the L0 layer was composed of ITO, the contents of the metal MA, the metal MB and the metal ME satisfied a relationship of 0.30≤a/(b+e)≤0.41, the atomic ratio e of the metal ME was 5 atomic % or more and 18 atomic % or less, and thus it was possible to achieve both reproduction durability (heat durability) and reflectance of the L0 layer. In addition, it was possible to secure a power margin of the L0 layer.

Modification Examples

While the first and second embodiments of the present disclosure have been described above in detail, the present disclosure is not limited to the above first and second

TABLE 2

| | MA | | | MB | | | | | MC Zn | MD | | |
|---|---|---|---|---|---|---|---|---|---|---|---|---|
| | Mn [at %] | Ni [at %] | a [at %] | W [at %] | Mo [at %] | Zr [at %] | Ta [at %] | b [at %] | (=c) [at %] | Cu [at %] | Ag [at %] | d [at %] |
| Comparative example 2-1 | 16 | 0 | 16 | 31 | 0 | 10 | 0 | 41 | 22 | 14 | 7 | 21 |
| Comparative example 2-2 | 9 | 0 | 9 | 14 | 0 | 10 | 0 | 24 | 22 | 24 | 11 | 35 |
| Comparative example 2-3 | 18 | 0 | 18 | 23 | 0 | 0 | 10 | 33 | 4 | 14 | 7 | 21 |
| Comparative example 2-4 | 20 | 0 | 20 | 21 | 0 | 0 | 10 | 31 | 0 | 14 | 11 | 25 |
| Example 2-1 | 20 | 0 | 20 | 34 | 0 | 0 | 10 | 44 | 4 | 14 | 0 | 14 |
| Example 2-2 | 20 | 0 | 20 | 28 | 0 | 0 | 10 | 38 | 10 | 14 | 0 | 14 |
| Example 2-3 | 10 | 10 | 20 | 27 | 0 | 10 | 0 | 37 | 4 | 14 | 7 | 21 |
| Example 2-4 | 20 | 0 | 20 | 21 | 0 | 0 | 10 | 31 | 10 | 14 | 7 | 21 |
| Comparative example 2-5 | 20 | 0 | 20 | 16 | 0 | 0 | 10 | 26 | 15 | 14 | 7 | 21 |
| Example 2-5 | 20 | 0 | 20 | 34 | 10 | 0 | 10 | 54 | 0 | 14 | 0 | 14 |
| Example 2-6 | 20 | 0 | 20 | 30 | 10 | 0 | 10 | 50 | 0 | 14 | 4 | 18 |
| Example 2-7 | 20 | 0 | 20 | 33 | 0 | 0 | 10 | 43 | 0 | 14 | 11 | 25 |
| Example 2-8 | 22 | 0 | 22 | 25 | 10 | 0 | 10 | 45 | 0 | 14 | 7 | 21 |
| Comparative example 2-6 | 20 | 0 | 20 | 25 | 0 | 0 | 10 | 35 | 12 | 14 | 7 | 21 |
| Example 2-9 | 20 | 0 | 20 | 44 | 0 | 10 | 0 | 54 | 0 | 14 | 7 | 21 |
| Example 2-10 | 20 | 0 | 20 | 36 | 0 | 10 | 0 | 46 | 4 | 14 | 11 | 25 |

| | ME Nb (=e) [at %] | a/(b + e) | Reflectance R [%] | Evaluation | Reproduction durability Pwo (4x) [mW] | Evaluation | PM(4x) [%] | Evaluation | Overall |
|---|---|---|---|---|---|---|---|---|---|
| Comparative example 2-1 | 0 | 0.39 | 2.7 | X | 30.9 | ⊚ | 21.5 | ◯ | X |
| Comparative example 2-2 | 10 | 0.26 | 2.9 | X | 32.6 | ⊚ | 20.5 | ◯ | X |
| Comparative example 2-3 | 24 | 0.32 | 3.2 | ◯ | 28.8 | ◯ | 17.8 | X | X |
| Comparative example 2-4 | 24 | 0.36 | 3.5 | ⊚ | 24.9 | X | 23.4 | ◯ | X |
| Example 2-1 | 18 | 0.32 | 3.1 | ◯ | 31.5 | ⊚ | 21.2 | ◯ | ◯ |
| Example 2-2 | 18 | 0.36 | 3.3 | ◯ | 29.3 | ◯ | 24.5 | ◯ | ◯ |
| Example 2-3 | 18 | 0.36 | 3.2 | ◯ | 29.6 | ◯ | 23.5 | ◯ | ◯ |
| Example 2-4 | 18 | 0.41 | 3.5 | ⊚ | 26.4 | ◯ | 22.4 | ◯ | ◯ |
| Comparative example 2-5 | 18 | 0.45 | 3.6 | ⊚ | 24.8 | X | 22.3 | ◯ | X |
| Example 2-5 | 12 | 0.30 | 3.0 | ◯ | 34.9 | ⊚ | 27.2 | ⊚ | ⊚ |
| Example 2-6 | 12 | 0.32 | 3.1 | ◯ | 32.7 | ⊚ | 28.0 | ⊚ | ⊚ |
| Example 2-7 | 12 | 0.36 | 3.2 | ◯ | 30.1 | ⊚ | 29.0 | ⊚ | ⊚ |
| Example 2-8 | 12 | 0.39 | 3.1 | ◯ | 26.8 | ◯ | 26.2 | ⊚ | ◯ |
| Comparative example 2-6 | 12 | 0.43 | 3.4 | ◯ | 23.2 | X | 25.3 | ⊚ | X |
| Example 2-9 | 5 | 0.34 | 3.0 | ◯ | 33.0 | ⊚ | 22.6 | ◯ | ◯ |
| Example 2-10 | 5 | 0.39 | 3.0 | ◯ | 31.5 | ⊚ | 24.3 | ◯ | ◯ |

In Table 2, "at %," "$P_{WO}(4\times)$," and "PM(4×)" are as follows.

at %: atomic % (atomic %)
R: reflectance of L0 layer
$P_{WO}(4\times)$: recording sensitivity (optimal recording power) during 4× speed recording and reproducing
PM (4×): recording power margin during 4× speed recording and reproducing The following can be seen from Table 2.

In the optical recording mediums in which the second dielectric layer (dielectric layer on the side of the substrate)

embodiments, and various modifications can be made based on the technical idea of the present disclosure.

For example, the configurations, methods, processes, shapes, materials, numerical values and the like exemplified in the above first and second embodiments are only examples, and as necessary, different configurations, methods, processes, shapes, materials, numerical values and the like may be used.

In addition, in the numerical ranges stated in stages in the above first and second embodiments, the upper limit value or the lower limit value of the numerical range in a certain stage may be replaced with the upper limit value or the lower limit value of the numerical range in another stage.

In addition, unless otherwise specified, the materials exemplified in the above first and second embodiments can be used alone or two or more thereof can be used in combination.

In addition, the chemical formulas of the compounds (for example, a stoichiometric compound) exemplified in the above first and second embodiments are representative, and if they are general names of the same compounds, stated valences and the like are not limited. For example, a non-stoichiometric compound or the like may be used.

In addition, in the first and second embodiments, the recording layer 41 of the information signal layers L1 to Ln other than the information signal layer L0 may have the same composition as the recording layer 41 of the information signal layer L0.

In addition, in the first and second embodiments, the recording layer 41 of the information signal layers L1 to Ln may be a known recording layer containing a Mn oxide or a known recording layer containing a Pd oxide. However, in order to reduce the cost of the optical recording mediums 1 and 1A, it is preferable that the recording layer 41 do not contain Pd, which is a noble metal.

In addition, in the above first and second embodiments, the information signal layer L have a configuration including the recording layer 41, the dielectric layer 42 provided adjacent to the first surface of the recording layer 41, and the dielectric layer 43 provided adjacent to the second surface of the recording layer 41 has been described, but the configuration of the information signal layer L is not limited thereto. For example, the dielectric layer may be provided only on any one of the first surface and the second surface of the recording layer 41. In addition, the information signal layer L may be composed of only a single recording layer 41. With such a simple configuration, it is possible to reduce the cost of the optical recording mediums 1 and 1A, and it is possible to improve the productivity thereof. This effect becomes more significant as the medium has a larger number of information signal layers L.

In addition, in the above first and second embodiments, an example in which respective layers of the optical recording mediums 1 and 1A are formed by a sputtering method has been described, but the film forming method is not limited thereto, and other film forming methods may be used. As other film forming methods, for example, a chemical vapor deposition (CVD) method (a technique of precipitating a thin film from a gas phase using a chemical reaction) such as thermal CVD, plasma CVD, and optical CVD methods, and a physical vapor deposition (PVD) method (a technique of forming a thin film by aggregating a physically vaporized material in a vacuum on a substrate) such as vacuum deposition, plasma-assisted deposition, sputtering, ion plating methods can be used.

In addition, in the above first and second embodiments, a case in which all the multi-layer information signal layers L have the same layer configuration (3-layer configuration) has been described, but the layer configuration may be changed according to characteristics (for example, optical characteristics and durability) required for each information signal layer L. However, in consideration of the productivity, it is preferable that all the information signal layers L have the same layer configuration.

In addition, the optical recording medium to which the present disclosure can be applied is not limited to those having the configuration in the first and second embodiments. The present disclosure can be applied to, for example, an optical recording medium (for example, compact disc (CD)) having a configuration in which a plurality of information signal layers and a protective layer are laminated in that order on a substrate and in which an information signal is recorded or reproduced by emitting a laser beam from the side of the substrate to the plurality of information signal layers or an optical recording medium (for example, a digital versatile disc (DVD)) having a configuration in which a plurality of information signal layers are provided between two substrates and in which an information signal is recorded or reproduced by emitting a laser beam from the side of at least one substrate to the plurality of information signal layers.

In addition, the present disclosure may have the following configurations.

(1) An optical recording medium, including
a plurality of information signal layers,
wherein the plurality of information signal layers include
a recording layer having a first surface that faces a light irradiation surface and
a second surface on the side opposite to the first surface,
a first dielectric layer that is provided on the side of the first surface, and
a second dielectric layer that is provided on the side of the second surface,
wherein the second dielectric layer provided in the information signal layer positioned on the innermost side when viewed from the light irradiation surface contains indium oxide and tin oxide,
wherein the recording layer provided in the information signal layer positioned on the innermost side when viewed from the light irradiation surface contains an oxide of a metal MA, an oxide of a metal MB, an oxide of a metal MD, and an oxide of a metal ME,
wherein the metal MA is at least one selected from the group consisting of Mn and Ni,
wherein the metal MB is at least one selected from the group consisting of W, Mo, Zr and Ta,
wherein the metal MD is at least one selected from the group consisting of Cu and Ag,
wherein the metal ME is Nb,
wherein the contents of the metal MA, the metal MB and the metal ME satisfy a relationship of $0.30 \leq a_1/(b_1-e_1) \leq 0.41$ (where, $a_1$: atomic ratio [atomic %] of the metal MA with respect to a total amount of the metal MA, the metal MB, the metal MD and the metal ME, $b_1$: atomic ratio [atomic %] of the metal MB with respect to a total amount of the metal MA, the metal MB, the metal MD and the metal ME, and $e_1$: atomic ratio [atomic %] of the metal ME with respect to a total amount of the metal MA, the metal MB, the metal MD and the metal ME), and
wherein the atomic ratio $e_1$ of the metal ME with respect to a total amount of the metal MA, the metal MB, the metal MD and the metal ME is 5 atomic % or more and 18 atomic % or less.

(2) The optical recording medium according to (1),
wherein the second dielectric layer provided in the information signal layer positioned outside the innermost side when viewed from the light irradiation surface contains zinc oxide, tin oxide and zirconium oxide.

(3) The optical recording medium according to (1) or (2),
wherein the first dielectric layer provided in the plurality of information signal layers contains a mixture of silicon oxide, indium oxide, and zirconium oxide.

(4) The optical recording medium according to any one of (1) to (3), wherein the atomic ratio of the metal MA with respect to a total amount of the metal MA, the metal MB, the metal MD and the metal ME is, for example, 11 atomic % or more and 30 atomic % or less, wherein the atomic ratio of the metal MB with respect to a total amount of the metal MA, the metal MB, the metal MD and the metal ME is, for example, 31 atomic % or more and 54 atomic % or less, and wherein the atomic ratio of the metal MD with respect to a total amount of the metal MA, the metal MB, the metal MD and the metal ME is, for example, 14 atomic % or more and 25 atomic % or less.

(5) The optical recording medium according to any one of (1) to (3), wherein the recording layer provided in the information signal layer positioned on the innermost side when viewed from the light irradiation surface further contains an oxide of a metal MC, wherein the metal MC is Zn, wherein the contents of the metal MA, the metal MB and the metal ME satisfy a relationship of $0.30 \le a_2/(b_2+e_2) \le 0.41$ (where, $a_2$: atomic ratio [atomic %] of the metal MA with respect to a total amount of the metal MA, the metal MB, the metal MC, the metal MD and the metal ME, $b_2$: atomic ratio [atomic %] of the metal MB with respect to a total amount of the metal MA, the metal MB, the metal MC, the metal MD and the metal ME, and $e_2$: atomic ratio [atomic %] of the metal ME with respect to a total amount of the metal MA, the metal MB, the metal MC, the metal MD and the metal ME), and wherein the atomic ratio $e_2$ of the metal ME with respect to a total amount of the metal MA, the metal MB, the metal MC, the metal MD and the metal ME is 5 atomic % or more and 18 atomic % or less.

(6) The optical recording medium according to (5), wherein the atomic ratio of the metal MA with respect to a total amount of the metal MA, the metal MB, the metal MC, the metal MD and the metal ME is, for example, 11 atomic % or more and 30 atomic % or less, wherein the atomic ratio of the metal MB with respect to a total amount of the metal MA, the metal MB, the metal MC, the metal MD and the metal ME is, for example, 31 atomic % or more and 54 atomic % or less, wherein the atomic ratio of the metal MC with respect to a total amount of the metal MA, the metal MB, the metal MC, the metal MD and the metal ME is, for example, more than 0 atomic % and 10 atomic % or less, and wherein the atomic ratio of the metal MD with respect to a total amount of the metal MA, the metal MB, the metal MC, the metal MD and the metal ME is, for example, 14 atomic % or more and 25 atomic % or less.

(7) The optical recording medium according to any one of (1) to (6), wherein the reflectance of the information signal layer positioned on the innermost side when viewed from the light irradiation surface is 3.0% or more and 4.5% or less.

(8) The optical recording medium according to any one of (1) to (7), including:

a first disc; and a second disc, wherein the first disc and the second disc include a substrate having a first surface and a second surface, a plurality of information signal layers provided on the side of the first surface of the substrate, and a cover layer provided on the plurality of information signal layers, wherein the second surface of the substrate included in the first disc and the second surface of the substrate included in the second disc are bonded to each other.

(9) The optical recording medium according to (8), wherein the optimal recording power of the information signal layer positioned on the innermost side when viewed from the light irradiation surface is 58 mW or more.

(10) The optical recording medium according to any one of (1) to (7), including a substrate;

the plurality of information signal layers provided on the substrate, and a cover layer provided on the plurality of information signal layers.

(11) The optical recording medium according to (10), wherein the optimal recording power of the information signal layer positioned on the innermost side when viewed from the light irradiation surface is 26 mW or more.

REFERENCE SIGNS LIST

1, 1A Optical recording medium
10 First disc
20 Second disc
30 Bonding layer
11, 11A, 21 Substrate
12, 22 Light transmitting layer
41 Recording layer
42 Dielectric layer (first dielectric layer)
43 Dielectric layer (second dielectric layer)
L0 to Ln, L0 to Lm Information signal layer
S1 to Sn, S1 to Sm Spacer layer
C Light irradiation surface
C1 First light irradiation surface
C2 Second light irradiation surface
Gv Groove
Ld Land
Tp Pitch

The invention claimed is:

1. An optical recording medium, comprising:
a plurality of information signal layers, wherein
the plurality of information signal layers includes:
a recording layer having a first surface that faces a light irradiation surface and a second surface on the side opposite to the first surface,
a first dielectric layer that is on the side of the first surface, and
a second dielectric layer that is on the side of the second surface, wherein
the second dielectric layer in the information signal layer positioned on the innermost side when viewed from the light irradiation surface contains indium oxide and tin oxide,
the recording layer in the information signal layer positioned on the innermost side when viewed from the light irradiation surface contains an oxide of a metal MA, an oxide of a metal MB, an oxide of a metal MD, and an oxide of a metal ME,
the metal MA is at least one selected from the group consisting of Mn and Ni,
the metal MB is at least one selected from the group consisting of W, Mo, Zr and Ta, the metal MD is at least one selected from the group consisting of Cu and Ag, the metal ME is Nb, the contents of the metal MA, the metal MB and the metal ME satisfy a relationship of $0.30 \leq a_1/(b_1+e_1) \leq 0.41$ (where, $a_1$: atomic ratio [atomic%] of the metal MA with respect to a total amount of the metal MA, the metal MB, the metal MD and the metal ME, $b_1$: atomic ratio [atomic%] of the metal MB with respect to a total amount of the metal MA, the metal MB, the metal MD and the metal ME, and $e_1$: atomic ratio [atomic%] of the metal ME with respect to a total amount of the metal MA, the metal MB, the metal MD and the metal ME), and the atomic ratio ei of the metal ME with respect to a total amount of the metal MA, the metal MB, the metal MD and the metal ME is 5 atomic% or more and 18 atomic% or less.

2. The optical recording medium according to claim 1, wherein the second dielectric layer in the information signal layer positioned outside the innermost side when viewed from the light irradiation surface contains zinc oxide, tin oxide and zirconium oxide.

3. The optical recording medium according to claim 1, wherein the first dielectric layer in the plurality of information signal layers contains a mixture of silicon oxide, indium oxide, and zirconium oxide.

4. The optical recording medium according to claim 1, wherein
the atomic ratio of the metal MA with respect to a total amount of the metal MA, the metal MB, the metal MD and the metal ME is, for example, 11 atomic% or more and 30 atomic% or less,
the atomic ratio of the metal MB with respect to a total amount of the metal MA, the metal MB, the metal MD and the metal ME is, for example, 31 atomic% or more and 54 atomic% or less, and
the atomic ratio of the metal MD with respect to a total amount of the metal MA, the metal MB, the metal MD and the metal ME is, for example, 14 atomic% or more and 25 atomic% or less.

5. The optical recording medium according to claim 1, wherein the recording layer provided in the information signal layer positioned on the innermost side when viewed from the light irradiation surface further contains an oxide of a metal MC, the metal MC is Zn, the contents of the metal MA, the metal MB and the metal ME satisfy a relationship of $0.30 \leq a_2/(b_2+e_2) \leq 0.41$ (where, $a_2$: atomic ratio [atomic %] of the metal MA with respect to a total amount of the metal MA, the metal MB, the metal MC, the metal MD and the metal ME, $b_2$: atomic ratio [atomic %] of the metal MB with respect to a total amount of the metal MA, the metal MB, the metal MC, the metal MD and the metal ME, and $e_2$: atomic ratio [atomic %] of the metal ME with respect to a total amount of the metal MA, the metal MB, the metal MC, the metal MD and the metal ME), and the atomic ratio $e_2$ of the metal ME with respect to a total amount of the metal MA, the metal MB, the metal MC, the metal MD and the metal ME is 5 atomic % or more and 18 atomic % or less.

6. The optical recording medium according to claim 5, wherein the atomic ratio of the metal MA with respect to a total amount of the metal MA, the metal MB, the metal MC, the metal MD and the metal ME is, for example, 11 atomic % or more and 30 atomic % or less,
the atomic ratio of the metal MB with respect to a total amount of the metal MA, the metal MB, the metal MC, the metal MD and the metal ME is, for example, 31 atomic % or more and 54 atomic % or less,
the atomic ratio of the metal MC with respect to a total amount of the metal MA, the metal MB, the metal MC, the metal MD and the metal ME is, for example, more than 0 atomic % and 10 atomic % or less, and
the atomic ratio of the metal MD with respect to a total amount of the metal MA, the metal MB, the metal MC, the metal MD and the metal ME is, for example, 14 atomic % or more and 25 atomic % or less.

7. The optical recording medium according to claim 1, wherein the reflectance of the information signal layer positioned on the innermost side when viewed from the light irradiation surface is 3.0% or more and 4.5% or less.

8. The optical recording medium according to claim 1, comprising:
a first disc; and
a second disc, wherein
the first disc and the second disc include:
a substrate having a first surface and a second surface,
a plurality of information signal layers on the side of the first surface of the substrate, and
a cover layer on the plurality of information signal layers, wherein the second surface of the substrate included in the first disc and the second surface of the substrate included in the second disc are bonded to each other.

9. The optical recording medium according to claim 8, wherein the optimal recording power of the information signal layer positioned on the innermost side when viewed from the light irradiation surface is 58 mW or more.

10. The optical recording medium according to claim 1, comprising
a substrate; wherein
the plurality of information signal layers on the substrate, and
a cover layer provided on the plurality of information signal layers.

11. The optical recording medium according to claim 10, wherein the optimal recording power of the information signal layer positioned on the innermost side when viewed from the light irradiation surface is 26 mW or more.

* * * * *